United States Patent [19]
Marena

[11] Patent Number: 5,655,572
[45] Date of Patent: Aug. 12, 1997

[54] HOSE ASSEMBLY

[75] Inventor: Alfonso Marena, Wethersfield, Conn.

[73] Assignee: Teleflex Incorporated, Plymouth Meeting, Pa.

[21] Appl. No.: 461,703

[22] Filed: Jun. 5, 1995

[51] Int. Cl.$^6$ ............................................. F16L 11/08
[52] U.S. Cl. ...................... 138/125; 138/127; 138/137; 138/146; 138/153
[58] Field of Search .................... 138/125, 123, 138/127, 137, 145, 146, 153, DIG. 3

[56] References Cited

U.S. PATENT DOCUMENTS

| | | | |
|---|---|---|---|
| 2,787,289 | 4/1957 | Press | 138/DIG. 3 |
| 3,023,787 | 3/1962 | Phillips et al. . | |
| 3,334,165 | 8/1967 | Koch . | |
| 3,463,197 | 8/1969 | Slade . | |
| 3,750,712 | 8/1973 | Brand . | |
| 3,857,415 | 12/1974 | Morin et al. | 138/125 |
| 4,111,237 | 9/1978 | Mutzner et al. . | |
| 4,259,989 | 4/1981 | Lalikos et al. | 138/127 |
| 4,273,160 | 6/1981 | Lowles . | |
| 4,303,457 | 12/1981 | Johansen et al. . | |
| 4,345,624 | 8/1982 | Rider | 138/127 |
| 4,384,595 | 5/1983 | Washkewicz et al. . | |
| 4,801,501 | 1/1989 | Harlow | 428/383 |
| 4,954,388 | 9/1990 | Mallouk et al. | 428/198 |
| 5,124,878 | 6/1992 | Martucci | 138/125 |
| 5,142,782 | 9/1992 | Martucci | 138/125 |
| 5,170,011 | 12/1992 | Martucci . | |
| 5,192,476 | 3/1993 | Green | 264/127 |
| 5,216,079 | 6/1993 | Crosby et al. | 525/146 |

*Primary Examiner*—David Scherbel
*Assistant Examiner*—James F. Hook
*Attorney, Agent, or Firm*—Kohn & Associates

[57] ABSTRACT

A lightweight hose assembly (10) of the type adapted for conveying fuels and other corrosive fluids is disclosed. The assembly (10) includes a tubular inner liner (12) including a polymeric fluorocarbon material resistant to chemical and heat degradation. A reinforcing layer (14) having gaps extending therethrough is disposed about the inner liner (12). The assembly (10) further includes an outer fluorocarbon coating (16) dispersed throughout the reinforcing layer (14). The hose assembly (10) is characterized by including a metallic reinforcing layer (18) disposed about the reinforcing layer (14) for increasing the strength and bending properties of the hose assembly (10). A method of making the hose assembly (10) includes the step of extruding the inner liner (12), applying a dispersion including a fluorocarbon polymer material and a carrier fluid over the inner liner (12), disposing a first braided reinforcing layer (14) about the inner liner (12) and over the applied dispersion, applying a second dispersion including a fluorocarbon polymer material in a carrier fluid over the reinforcing layer (14) to chemically bond the reinforcing layer (14) to the inner layer (12) and the first applied dispersion. A metallic braided reinforcing layer (18) is then applied about the first braided reinforcing layer (14).

16 Claims, 1 Drawing Sheet

HOSE ASSEMBLY

TECHNICAL FIELD

The subject invention relates a hose construction. More specifically, the subject invention relates to a hose assembly having improved strength and bending properties.

BRIEF DESCRIPTION OF THE RELATED ART

Hose assemblies for conveying fuel and other corrosive materials are well known in the art. Such assemblies are exposed to a variety of fuel mixtures, fuel additives, and caustic materials in addition to being exposed to extreme temperatures. Thus, such hose assemblies must be resistant to chemical, environmental, and physical degradation as a result of chemical exposure, environmental exposure to heat, and physical degradation resulting from bending and repeated movement or forces applied to the assembly.

Polymeric fluorocarbon materials such as polytetrafluoroethylene possess the requisite chemical and temperature resistant properties for most fuel hose applications. Unfortunately, however, polymeric fluorocarbon materials exhibit relatively more poor tensile and hoop strengths. As a consequence, such fluorinated materials are prone to kinking. Such kinking remains permanent and provides a continual resistance to fluid flow through the hose assembly. Moreover, as a result of a fluorinated material's low tensile strength, attachment of securing or coupling members to the hose assembly is substantially compromised.

Various approaches have been described for offering additional strength to a polymeric fluorocarbon liner. One approach involves braiding fibers about the inner fluorocarbon liner. The braided fibers offer additional strength to the fluorocarbon liner resulting in a hose assembly that resists kinking. In the example of such an approach is disclosed in U.S. Pat. No. 5,124,878, filed Jul. 12, 1991, and assigned to the assignee of the subject invention. The hose assembly described in the '878 patent includes an inner fluorocarbon polymeric liner, a braided reinforcing layer disposed about the exterior of the inner liner, and is characterized by including an organic polymeric material dispersed in the reinforcing layer which connects the reinforcing layer to the inner liner thereby providing a hose assembly which is stronger and more kink resistant.

An additional example for strengthening an inner fluorocarbon liner with an outer liner while also increasing flexibility is shown in U.S. Pat. No. 3,023,787 to Phillips et al. The Phillips et al. patent discloses a convoluted hose assembly having a fluorocarbon inner liner constructed of many layers of helically wrapped Teflon® tape. Convoluted hoses are typically employed because they provide flexibility to a fluorocarbon hose assembly, however, convoluted hose assemblies have inherent weaknesses. A reinforcing strip consisting of reinforcing fibers coated with a plastic material is wrapped about the inner layer to provide additional strength to the assembly due to the inherent weakness of wrapped convoluted core construction. In its final assembly, a metal braid is applied to the outside of the hose assembly to impart greater strength. Hose assemblies of the type described in the Phillips et al. patent have several inherent drawbacks. First, because the inner liner is formed by helically wrapping layers of a fluorocarbon tape, it requires a greater amount of fluorocarbon material to be utilized in order to construct the inner liner which adds to both the cost of constructing the hose assembly and to the labor intensity of constructing the hose assembly. Other drawbacks associated with hoses of the type disclosed in the Phillips et al. patent includes failure of seams created by helically wrapping layers of Teflon® tape. These failures occur due to inherent weaknesses in bonding the seams created by the overlapping layers of tape which, under internal pressures and prolonged movement are prone to leakage or to bursting. In addition, the seams create undulations within the inner liner which cause disruption in the flow of liquids therein which could give rise to increased electrical charge buildup within the hose.

Therefore, it would be desirable to have a hose assembly which includes a polymeric fluorocarbon inner liner which is resistant to kinking while additionally possessing greatly increased bending properties while maintaining the overall integrity of the hose assembly.

SUMMARY OF THE INVENTION AND ADVANTAGES

In accordance with the present invention, there is provided a hose assembly including an extruded smooth bore tubular inner liner, a reinforcing layer having gaps extending therethrough disposed about the inner liner, an intermediate coating including a fluorocarbon polymeric material dispersed in the reinforcing layer for strengthening and connecting the reinforcing layer to the inner liner. The hose assembly is characterized by a metallic reinforcing layer disposed about the reinforcing layer for increasing the strength and bending properties of the hose assembly.

Additionally, according to the present invention, a method for constructing a hose assembly is also provided. The method includes the steps of extruding a polymeric fluorocarbon inner liner, applying a polymeric fluorocarbon dispersion over the inner liner, disposing a first braided reinforcing layer about the tubular inner liner and over the first applied dispersion. A second polymeric fluorocarbon dispersion is then applied over the reinforcing layer to chemically bond the reinforcing layer to the inner liner in the first applied dispersion. The method is characterized by the step of disposing a second braided reinforcing layer about the first braided reinforcing layer thereby providing a hose assembly which has improved flexibility and kink resistance.

Accordingly, the present invention provides a hose assembly including a polymeric fluorocarbon inner liner having chemical and heat resistant properties and a metallic reinforcing layer providing support and strength to the inner liner thereby increasing the hose assembly's flexibility and resistance to kinking.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
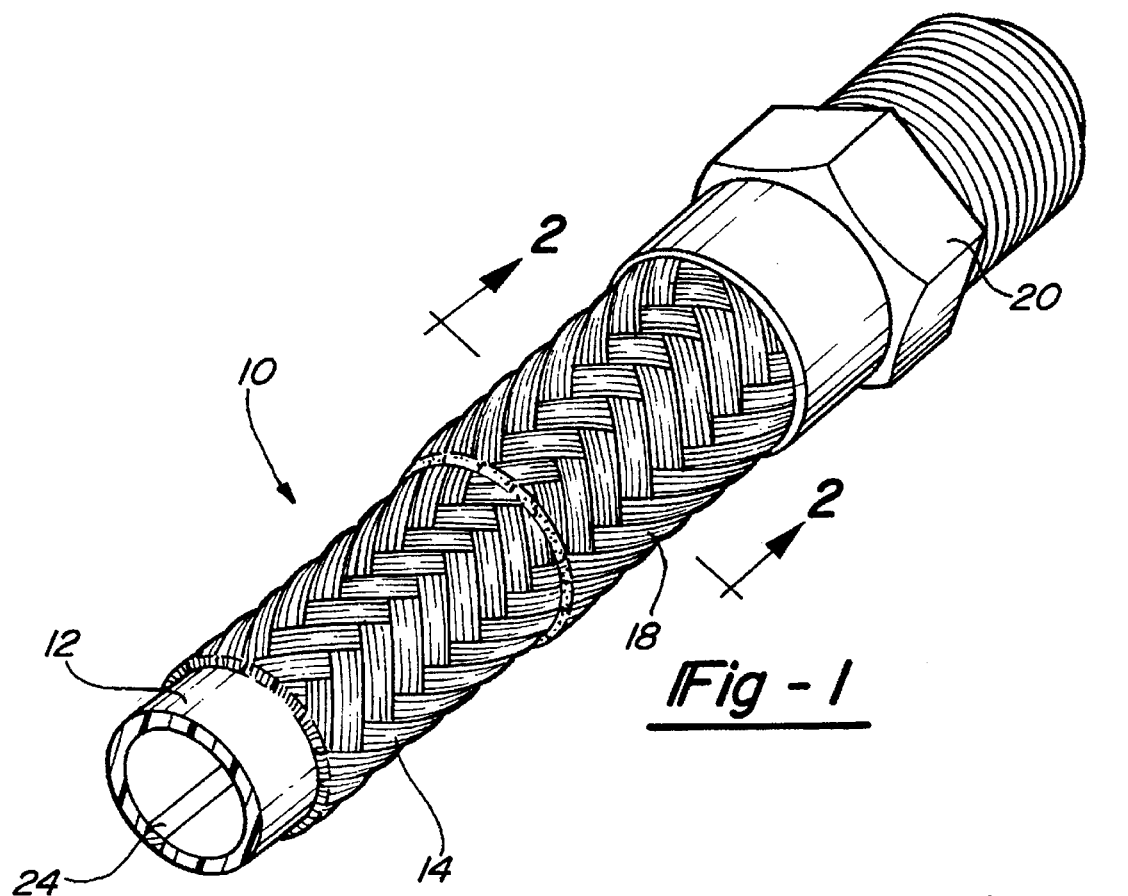
FIG. 1 is a perspective view of partially broken away and in cross-section of the preferred embodiment of the subject invention.

A hose assembly made in accordance with the present invention is generally shown at 10 in FIG. 1. The assembly 10 includes a tubular inner liner 12, a reinforcing layer 12, an intermediate coating dispersed in the reinforcing layer 14 and a metallic reinforcing layer 18 disposed about the intermediate reinforcing layer 14. A coupling means 20 adapted to engage the ends of the hose assembly 10 may be included.

Figure 2:
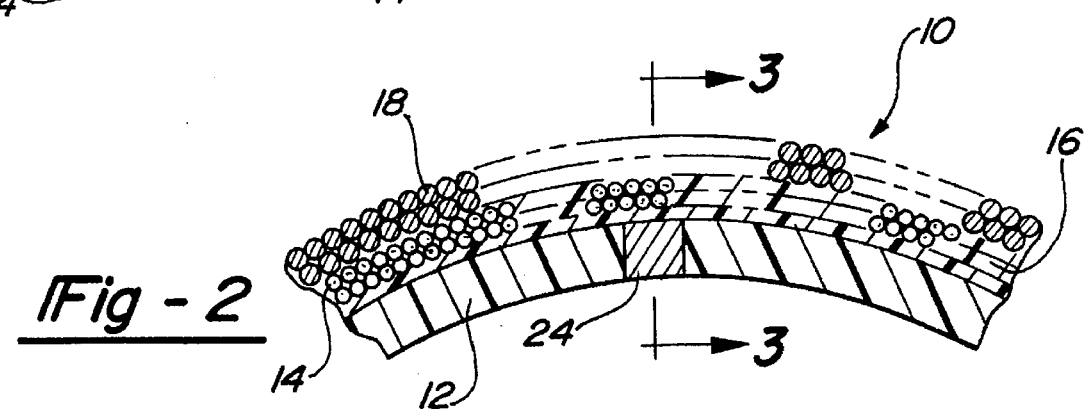
FIG. 2 is an enlarged sectional view of the hose assembly taken along line 2—2 of FIG. 1.
Figure 3:
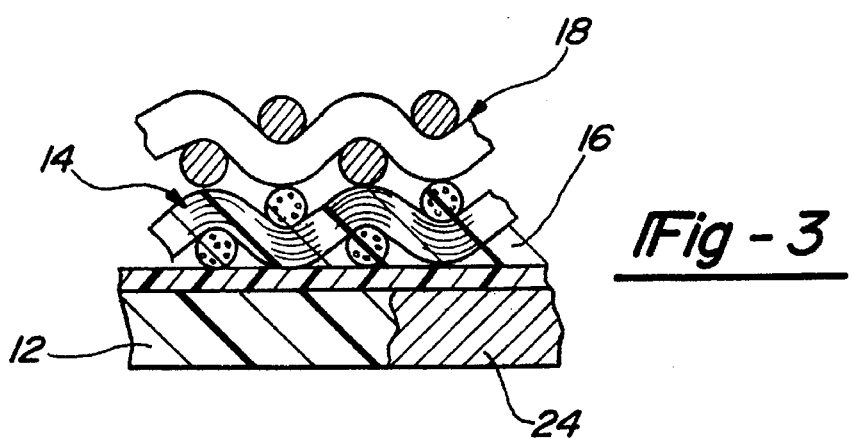
FIG. 3 is an enlarged cross-sectional view of the subject invention taken along line 3—3 of FIG. 2.

The tubular inner layer 12, as best shown in FIGS. 1 and 2, includes a polymeric fluorocarbon material resistant to both chemical and heat degradation, thus allowing a variety of fluids, particularly automotive fuels and fuel additives, e.g., detergents, alcohols, etc., to pass through the inner liner 12 without corroding or degrading the inner liner 12. The inner liner 12 is preferably extruded using well known melt or paste extrusion techniques and has a wall thickness between 0.001 and 0.120 inches. Although the inner liner 12 may be made of any number of polymeric fluorocarbon materials, the inner liner 12 is ideally made from a polymer of the following: polytetrafluoroethylene (PTFE), the homopolymer of tetrafluoroethylene sold under the trademark TEFLON® by DuPont, perfluorinated ethylenepropylene (FEP), copolymer of tetrafluoroethylene and hexafluoropropylene sold under the trademark TEFLON® FEP by DuPont, perfluoroalkoxy fluorocarbon resins (PFA), the copolymer of tetrafluoroethyleneperfluorovinyl ether sold under the trademark TEFLON® PFA by DuPont, or ethylene tetrafluoroethylene (ETFE), the copolymer of ethylene and tetrafluoroethylene sold under the trademark TEFZEL by DuPont. In addition to the aforementioned polymeric fluorocarbon materials, polychlorotrifluoroethylene, the homopolymer of chlorotrifluoroethylene, and polychlorotrifluoroethylene-ethylene, the copolymer of chlorotrifluoroethylene and ethylene may also be used.

The liner 12 is extruded to provide an inner liner 12 which has a smooth bore, free of undulations and seams which can cause turbulence of fluid flow within the inner liner 12. Turbulence can cause build-up of electrical charge within the hose assembly which is undesirable in the situation where potentially flammable fluids are being transported therethrough. Extruding the inner liner 12 creates an inner liner 12 which as no seams and undulations and is, therefore, the preferred method for forming the inner liner 12.

The assembly 10 further includes an intermediate reinforcing layer 14, having gaps extending therethrough. Generally, the reinforcing layer 14 is constructed of a braided or woven material. The reinforcing layer 14 can comprise any non-metallic material disposed in interleaving fashion or wrapped tightly about the inner liner 12. The structure of the material which includes the intermediate reinforcing layer 14 is generally a braid or weave of interlocking fibers which create gaps or interstitial spaces which facilitate the connection of reinforcing layer 14 to the inner liner 12. Preferably, the material used for the reinforcing layer 14 is glass fiber such as fiberglass. Glass fibers provide the necessary strength needed to reinforce the inner liner 12 and glass fibers are also heat resistant which is important for use in high temperature environments.

In a preferred embodiment, the glass fibers are tightly woven such that the gaps are spaces between the adjacent fibers are minimal. Further, the reinforcing layer 14 adds tensile strength to the hose assembly 10.

The glass fibers are preferably woven at a neutral braid angle which is approximately 54 degrees, 74. This angle is preferred since there is no movement of the hose under internal pressure in either the longitudinal (length) or across the diameter. It is preferred that the braid angle is as close to the neutral angle as possible. However, variations in materials, selection of reinforcing fiber material, and the machines used to apply the braid in part some variation. Additionally, braided reinforcing layer 14 imparts increased hoop strength to the hose assembly 10.

The reinforcing layer 14 is preferably applied about the exterior of the inner liner 12 by utilizing a braiding machine well known in the art. The machine includes a plurality of spools which carry the fiber material. The fibers are fed through the machine to a braiding area. In the braiding area, the fibers are braided or wound about the inner liner 12 to form the braided reinforcing layer 14. Alternatively, the braided reinforcing layer 14 also may be constructed in a pre-made sock-like fashion and then applied about the exterior of the inner liner 12.

Due to the chemical inertness in general lubricous nature of polymeric fluorocarbon materials, relative movement between inner and outer concentric polymeric fluorocarbon liners is often encountered in prior art hose assemblies. This relative movement can lead to weakness in the final hose assembly. The present hose assembly 10 is modified to eliminate such relative movement between the inner liner 12 and the braided reinforcing layer 14.

The assembly 10 further includes an organic polymeric dispersion or coating 16 dispersed throughout the braided layer 14. Specifically, an organic polymeric material is dispersed throughout the braided layer 14 and is located from the outer periphery of the braided reinforcing layer 14 radially inwardly toward the inner liner 12 as best shown in FIG. 2. That is, the coating 16 is distributed in the interstitial spaces created by the weaving or braiding of the individual fibers to form the reinforcing layer 14 and thereby forms a single layer therewith.

Preferably, the coating 16 includes a fluorocarbon polymer material and is selected from the following materials: the polymer of tetrafluoroethylene (PTFE), the polymer of fluorinated ethylene propropylene (FEP), the polymer of perfluoroalkoxy resins (FPA), or the polymer of ethylene tetrafluoroethylene (ETFE).

Due to the properties of the fluorocarbon polymer material, the coating 16 provides the hose assembly 10 with the necessary resistance to both heat and chemical degradation while also bonding the braided reinforcing layer 14 to the inner liner 12. That is, the fluorocarbon polymer material coats the outside of the inner liner 12 and permeates or is dispersed throughout the braided reinforcing layer 14 thereby chemically bonding the braided reinforcing layer 14 to the inner liner 12. The materials which comprise the inner liner 12 and the coating 16 are able to form a covalent bond when combined in a molten form and then subsequently allowed to cool.

The intermediate coating 16 is formed by applying the organic polymeric material about the inner liner 12 prior to braiding or weaving of the glass fibers about the inner liner 12 as described above. Preferably, the organic polymeric material includes a dispersion containing the fluorocarbon material and a carrying agent (i.e., a solvent). Additionally, a surfactant may also be used in the dispersion to allow the fluorocarbon material to more evenly flow and spread about the surface of the inner liner 12. That is, because of the inherent nature of fluorocarbon polymer materials, that primarily being their non-reactivity, the surfactant lowers surface tension allowing the fluorocarbon polymer material in the dispersion be more evenly distributed over the surface of the inner liner 12. Preferably, the dispersion includes between about 50% to 60% solid fluorocarbon polymer material (in fine granules or in particulate form), and between about 40% to about 50% carrying agent or solvent. The carrying agent carries the solid fluorocarbon material and disperses the material onto the inner liner 12. The preferred carrying agent is water, but other suitable carrying agents may be used. If a surfactant is used, it is preferably used in amounts between about 1% to about 10% of the total weight of the dispersion. Any suitable surfactant can be used, such as FLUORAD FLUOROCHEMICAL FC 171 (liquid) and FLUORAD FLUOROCHEMICAL FC 143 (power case) sold by the 3M Corporation, and SILWETT 77 sold by Union Carbide have been found to work especially well.

Once the dispersion is applied about the inner liner 12, the braided reinforcing layer 14 is then disposed about the inner liner 12 having the dispersion thereon. Using braided material, the braiding is done in such a manner that the braiding operation forces the dispersion into the interstitial spaces of the braided layer 14 and about the exterior of all of the glass fibers including the braided reinforcing layer 14. That is, enough dispersion is applied about the inner liner 12 so as to coat the entire braided reinforcing layer 14 as the braided reinforcing layer 14 is applied about the exterior of the inner liner 12 having the dispersion thereon. In this manner, the outer periphery of each individual fiber is completely coated. In addition, a second dispersion containing the same fluorocarbon polymer material, carrying agent and surfactant can be applied over the braided reinforcing layer 14 so as to provide a more definite coating of the fibers including the braided reinforcing layer 14. That is, the second dispersion is applied to insure that a complete bond is formed between the braided reinforcing layer 14 and the inner liner 12. By utilizing two distinct dispersion steps, Applicant has found that voids or gaps in the intermediate coating 16 which bonds the reinforcing layer 14 to the inner liner 12 are virtually eliminated. By eliminating these voids or gaps in the intermediate coating 16, a more positive bond is achieved between the reinforcing layer 14 and the inner liner 12 thereby reducing the likelihood that the reinforcing layer 14 will delaminate from the inner liner 12 thereby causing the potential for the hose assembly 10 to kink or fail at that location.

Enough dispersion is applied about the inner liner 12 and over the reinforcing layer 14 so as to coat the entire braided layer 14. In this manner, the outer periphery of each individual fiber is completely coated. The carrying agent and the surfactant, if used, are then removed from the dispersion by drying (heating) the hose assembly 10 thereby leaving the fluorocarbon polymer material dispersed throughout the entirety of the braided layer 14. The hose assembly 10 is then subsequently sintered to cure the fluorocarbon polymer material dispersed throughout the braided reinforcing layer 14 into the intermediate coating 16. The sintering operation fuses the fluorocarbon polymer material of the dispersion to both the braided reinforcing layer 14 and the fluorocarbon polymer material including the inner liner 12.

As previously stated, both the inner liner 12 and the intermediate coating 16 are preferably fluorocarbon polymers. It is not necessary that both the inner liner 12 and the intermediate coatings 16 be of the same fluorocarbon polymer, although they may be. For example, the inner liner 12 may be made of PFA while the coating 16 is made of PTFE. Any combination of fluorocarbon polymers can be utilized for the inner liner 12 and the coating 16. By utilizing similar fluorocarbon polymers, a strong bond between the inner liner 12 and the coating 16 can be achieved. Furthermore, by coating the inner liner 12 prior to braiding the reinforcing layer 14 about the inner liner 12 and by also coating the braided layer 14 subsequent to its disposal about the inner liner 12, it is insured that a sufficient amount of polymer will be retained between the braided reinforcing layer 14 and the inner liner 12 to form an acceptable bond therebetween.

The intermediate coating 16 acts as an adhesive or co-adhesive to bond the braided reinforcing 14 to the inner liner 12, thus, prohibiting slippage, i.e., relative longitudinal or rotary movement between the inner liner 12 and the braided reinforcing layer 14. That is, the coating 16, dispersed throughout the braided reinforcing layer provides strength to the inner liner 12 upon bending of the hose assembly 10. Thus, by using a polymeric fluorocarbon coating 16 dispersed throughout the braided reinforcing layer 14, a hose assembly 10 is produced which results in hoop strength of the inner liner 12 being increased so that the inner liner 12 can be bent without kinking. Further, the intermediate coating 16 allows the hose assembly 10 to operate at higher working pressures. That is, the coating 16 provides strength to the inner liner 12 and allows the inner liner 12 to accommodate fluids to be transported under greater pressure.

The metallic braided outer liner 18, as best shown in FIGS. 1 and 2, is disposed about the braided reinforcing layer 14 and the coating 16. The metallic braided layer 18 includes a metallic material for increasing the strength and flexibility of the hose assembly 10. More specifically, the metallic outer layer 18 allows the inner liner 12 to be bent to small radii without kinking. That is, the outer metallic layer 18 provides strength to the inner liner 12 upon bending. This is commonly referred to as hoop strength. Thus, by disposing the outer metallic layer 18 about the braided reinforcing layer 14 and the inner liner 12, the hoop strength of the inner liner 12 is increased, thus improving the bend radius of the hose assembly 10. Improvement in the bend radius allows the hose assembly 10 to be manipulated or placed into configurations which would impinge or kink the inner liners of prior art hose assemblies as shown in Table 1. In other words, the metallic outer layer 18 allows for a reduction in static bend radius of the hose assembly 10 thereby allowing the hose assembly 10 to be utilized in a greater number of applications. Additionally, the metallic outer layer 18 adds to the burst strength of the hose assembly. In other words, the metal outer layer 18 allows the hose assembly 10 to be used in applications where the hose assembly 10 is operated at much higher operating pressures without bursting of the hose assembly 10. Furthermore, the metallic outer layer 18 provides for more positive fixation of couplings or end fittings 20 to the hose assembly 10 as shown in FIG. 1. The metallic outer layer 18 increases the tensile strength that the hose assembly 10 sufficiently to fixedly connect the coupling member 20 (FIG. 1) to the hose assembly 10.

The outer metallic layer 18 can be made of any suitable metal material. In the preferred embodiment of the hose assembly 10, the outer layer 18 is made from stainless steel. The metallic outer layer 18 is preferably braided in place over the first braided reinforcing layer 14 and the intermediate fluorocarbon coating 16. The metallic braided outer layer 18 is preferably applied about the exterior of the intermediate coating 16 by utilizing a braiding machine well known in the art. The machine includes a plurality of spools which carry appropriately sized stainless steel wire material. The stainless steel wire is fed through the machine to a braiding area. In the braiding area, the wires are braided or wound about the exterior of the coating 16 and the first braided reinforcing layer 14. Alternatively, the metallic braided layer 18 also may be constructed in its entirety in a sock-like fashion and then applied about the exterior of the first braided reinforcing layer 14 and the intermediate coating 16. Unlike the braided reinforcing layer 14, the metallic braided outer layer 18 is not bonded to any of the underlying structure. That is, the braided metallic outer layer 18 is not affixed to the underlying hose assembly. The braided layer 18 can be applied utilizing a braiding machine which is commonly known as a maypole braider or may be applied using a rotary braider which is commonly known in the art. Each machine applies the braid differently, however, achieve the same results, that is, a $^2$ over $^2$, construction.

As fluid flows through the inner liner 12, electrical charges tend to build up throughout the length of the inner liner 12. In order to prevent these electrical charges from accumulating, the inner liner 12 can include an integral longitudinal conductive means 24 co-extensive with the length of the inner liner 12 for conducting an electrical charge along the length of the inner liner 12. Preferably the integral conductor 24 includes a conductive strip 24 of carbon black, as shown in FIGS. 1 and 2. Alternatively, the integral conductor 24 can comprise an inner layer (not shown) of carbon black positioned adjacent and inner surface of the inner liner 12. Alternatively, the integral conductor 24 can be interspersed throughout the inner liner 12 by intermixing carbon black throughout the polymeric fluorocarbon material while the inner liner 12 is extruded (not shown).

The hose assembly 10 further includes a coupling 20 as shown in FIG. 1. The coupling 20 is adapted to engage the ends of the hose assembly 10 for interconnecting the hose assembly 10 to a flow of fluid, e.g., fuel flow to and from a fuel tank (not shown). Couplings suitable for use with the hose assembly 10 of the present invention are well known in the art. Typically, the couplings 24 are adapted to engage the ends of the hose assembly 10. The couplings are adapted by way of an insert portion (not shown) which engages the inner surface of the inner liner 12. The insert portion can have a plurality of barbs (not shown) for engaging the inner surface of the inner liner 12.

The coupling 24 can also include an engaging portion (not shown) extending longitudinally from the insert portion for engaging a fitting (not shown). The engaging portion may comprise a male threaded member 28 or female threaded member (not shown). The engaging portion can comprise any configuration that will cooperate with the member to which it is connected with. For example, the engaging portion can comprise a socket to receive a mating ball joint (not shown).

Alternatively, in place of the engaging portion, the coupling 24 can provide an additional insert portion (not shown) for inserting into an engaging the interior surface of the inner liner 12. The coupling 24 is preferably made from a metallic material or an organic polymeric material and is mechanically connected to the hose assembly 10, as shown in FIG. 1. Alternatively, the coupling 24 can be molded to the hose assembly (not shown). Additionally, the coupling 24 can be any other well known type of the coupling known to those skilled in the art.

The preferred method for making the hose assembly 10 as shown in the Figures is as follows. The inner organic polymeric liner 12 is provided. Specifically, the inner liner 12 is extruded in a well known manner from a fluorocarbon polymer. The inner liner 12 is extruded preferably having a smooth bore and seamless structure. Additionally, if a conductor is to be included in the hose assembly 10, the conductor 24 can be simultaneously extruded into the inner liner 12. The inner liner 12 is passed through a reservoir containing an aqueous dispersion of the fluorocarbon polymer material.

Alternatively, the dispersion may be sprayed onto the inner liner 12 or may be brushed onto the inner liner 12. If no surfactant is contained in the dispersion material and it is desired that a surfactant be used, it can be applied to the assembly by dipping the assembly into a reservoir containing the surfactant or spraying the, surfactant directly thereon. Preferably, the surfactant would be applied to the inner liner 12 prior to applying the polymeric fluorocarbon dispersion to the inner liner 12. That is, regardless of whether the dispersion contains the surfactant therein, surfactant may be applied to the hose assembly 10 prior to the application of the dispersion thereto.

As was previously stated, the reservoir containing the dispersion can comprise a chamber having the solution therein, or the reservoir can comprise brushes having the dispersion thereon. The brushes are in continuous engagement with the inner liner 12 to coat the inner liner 12.

Preferably, the dispersion is an aqueous dispersion including the fluorocarbon polymer material therein. Because the dispersion is preferably aqueous, the preferred carrying agent is water. The dispersion is applied about the entire inner liner 12. The braided material is then applied about the exterior of the inner liner 12 having the dispersion thereon by braiding, weaving, or wrapping the fibers about the inner liner 12. Alternatively, the fibers may be braided to form a sock-like construction into which the inner liner 12 is placed. The braided material is applied by such that the dispersion is dispersed throughout the interstitial spaces of the braided reinforcing layer 14. That is, by wrapping the braided material about the inner liner 12, some of the dispersion is forced into the interstitial spaces at about the exterior of the fibers including the reinforcing layer 14.

After the braiding is completed, the inner liner 12 including the fluorocarbon polymer dispersion and the braided reinforcing layer 14 thereon, the assembly can be passed for a second time through a reservoir containing the aqueous dispersion of the fluorocarbon polymer material. Alternatively, the dispersion can be sprayed onto the inner liner 12 or may be brushed onto the inner liner 12. If no surfactant is contained in the dispersion material, and it is desired that a surfactant be used, it can be applied to the assembly by dipping the assembly into a reservoir containing the surfactant or spraying the surfactant directly thereon. Preferably, the surfactant would be applied to the braided reinforcing layer 14 prior to the application of the polymeric fluorocarbon dispersion to the braided reinforcing layer 14. That is, regardless of whether the dispersion contains the surfactant therein, surfactant can be applied to the hose assembly 10 prior to applying the dispersion thereto.

After the braiding is completed or after the dispersion is applied over the braided reinforcing layer 14, the carrying agent and surfactant (if any) are removed from the dispersion. Specifically, the hose assembly 10 is passed through a dryer (a preheated oven) which is preferably below the boiling temperature of the carrying agent (e.g., for water: 212° F.). By utilizing an oven at a temperature below the boiling temperature of a carrying agent, a bubbling effect is avoided in the final product thereby providing a hose assembly which is free from surface defects. The temperature can be above the boiling temperature, however, the hose assembly 10 may contain many bubbles in the coating 16 if higher drying temperatures are used. Subsequently, the surfactant (if used) is removed from the dispersion by heating the hose assembly 10 as discussed above. Generally, higher temperatures are required to remove the surfactant then those required to remove the carrying agent, i.e., usually 450° to 575° F. Thus, once the carrying agent and the surfactant (if any) are removed from the dispersion, the fluorocarbon material is left dispersed throughout the entirety of the braided reinforcing layer 14 and about the inner liner 12. The hose assembly 10 is then sintered at a suitable temperature (roughly 700° F.) to cure the fluorocarbon material into the coating 16. That is, the particular fluorocarbon polymer material is fused at the elevated temperatures to form a continuous coating 16. Because glass fibers are used for the braided layer 14, they are unaffected by the temperatures required to sintered the fluorocarbon polymers of the inner liner 12 and the dispersion including the coating 20. Following the sintering step, the braided metal outer layer 18 is applied as described above.

Throughout this application various publications are referenced by citation or number. Full citations for the publication are listed below. The disclosure of these publications in their entireties are hereby incorporated by reference into this application in order to more fully describe the state of the art to which this invention pertains.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

periphery, said intermediate coating (16) extending from the outer periphery of said reinforcing layer (14) radially inwardly toward said inner liner (12).

4. An assembly (10) as set forth in claim 1 further characterized by said reinforcing layer (14) including a tightly wound non-metallic material.

5. An assembly (10) as set forth in claim 4 further characterized by said non-metallic material including glass fiber.

6. An assembly (10) as set forth in claim 1 further characterized by said outer reinforcing layer (18) including a metallic material.

7. An assembly (10) as set forth in claim 6 further characterized by said metallic material including stainless steel.

8. An assembly (10) as set forth in claim 1 further characterized by said polymeric fluorocarbon material including polytetrafluoroethylene.

9. An assembly (10) as set forth in claim 1 further characterized by said polymeric fluorocarbon material including perfluorinated ethylene-propylene.

10. An assembly (10) as set forth in claim 1 further characterized by said fluorocarbon polymer comprising perfluoralkoxy.

11. An assembly (10) as set forth in claim 1 further characterized by said polymeric fluorocarbon material including polyfluoroethylene.

TABLE 1

| Hose Size | TFX Series Operating Pressure | Standard Hose Operating Pressure* | Convoluted Operating Pressure | TFX Series Bend Radius (In) | Standard Hose Bend Radius⁺ (In) | Convoluted Bend Radius |
|---|---|---|---|---|---|---|
| −04 | 4000 PSI** | 3000 PSI | — | 1.25 | 2.00 | — |
| −06 | 3500 PSI | 2500 PSI | 1000 | 2.25 | 4.00 | 1.00 |
| −08 | 2500 PSI*** | 2000 PSI | 1250 | 3.00 | 5.00 | 1.50 |
| −10 | 1800 PSI | 1500 PSI^ | 1400 | 4.25 | 6.50 | 2.00 |
| −12 | 1500 PSI | 1200 PSI^ | 1100 | 5.50 | 7.50 | 2.50 |
| −16 | TBD | 1000 PSI | 1000 | TBD | 9.00 | 3.00 |

— TFX Series operating temperature −40° F. to +400° F.
*According to published catalog data for Aeroquip 2807, Everflex 'S' Series, Parker 919 and Titeflex R115.
⁺Listed catalog bend radii are slightly lower for 'S' Series in some sizes; slightly higher for R 115 and 919 in some sizes.
^Slightly higher for 'S' Series.
**For T1764-04 maximum operating pressure for dynamic bend applications is 3500 PSI.
***For T1764-08 maximum impulse or pump discharge pressure is 2200 PSI at 400° F.

What is claimed is:

1. A hose assembly (10) consisting of an extruded, smooth bore tubular inner liner (12) comprising a polymeric fluorocarbon material, a reinforcing layer (14) having gaps extending therethrough disposed about said inner liner (12), an intermediate coating (16) including a fluorocarbon polymeric material sufficiently dispersed in said reinforcing layer to affix the reinforcing layer (14) to the inner liner (12) for strengthening and connecting said reinforcing layer (14) to said inner liner (12), and characterized by a metallic reinforcing layer (18) disposed about and continuously in contact with said reinforcing layer (14) for increasing the strength and bending properties of said hose assembly (10).

2. An assembly (10) as set forth in claim 1 further characterized by said fluorocarbon polymeric material of said intermediate coating (16) dispersed in said reinforcing layer (14) and said tubular inner liner (12) being the same material.

3. An assembly (10) as set forth in claim 2 further characterized by said reinforcing layer (14) having an outer 12. An assembly (10) as set forth in claim 1 further characterized by said polymeric fluorocarbon material including perfluoralkoxy fluorocarbon resin.

13. An assembly (10) as set forth in claim 1 further characterized by said polymeric fluorocarbon material including ethylenetetrafluoroethylene.

14. An assembly (10) as set forth in claim 1 further characterized by said inner liner (12) including an integral conductive (24) means coextensive with the length of said inner liner (12) for conducting electrical charges along the length of said inner liner (12).

15. An assembly (10) as set forth in claim 14 further characterized by said integral conductive means (24) including carbon black.

16. An assembly (10) as set forth in claim 1 further characterized by including coupling means (20) adapted to engage the ends of said hose assembly (10) for interconnecting said hose assembly (10) to a flow of fluid.

* * * * *